United States Patent [19]

Cech

[11] 3,802,868
[45] Apr. 9, 1974

[54] METHOD OF REFINING SUBSTANTIALLY SULPHUR-FREE COPPER ORE CONCENTRATES

[76] Inventor: Robert E. Cech, R. D. No. 1, Box 196A, Hetcheltown Rd., Scotia, N.Y. 12302

[22] Filed: June 7, 1972

[21] Appl. No.: 260,535

[52] U.S. Cl............................. 75/72, 75/74, 75/89
[51] Int. Cl............................................. C22b 15/00
[58] Field of Search............. 75/1, 3, 4, 72, 74, 117, 75/89; 423/33

[56] References Cited
UNITED STATES PATENTS

| | | | |
|---|---|---|---|
| 1,865,153 | 6/1932 | Taplin..................................... | 75/72 |
| 3,186,833 | 6/1965 | Cech....................................... | 75/72 |
| 3,441,403 | 4/1969 | Fredrickson et al.................... | 75/74 |
| 3,300,299 | 1/1967 | Plint........................................ | 75/72 |

Primary Examiner—L. Dewayne Rutledge
Assistant Examiner—W. R. Satterfield
Attorney, Agent, or Firm—Andrus, Sceales, Starke & Sawall

[57] ABSTRACT

A method of refining copper ore concentrates. Ore concentrates are initially cleaned and dried and then mixed with an alkali metal sulfate, copper chloride, and carbon. The alkali metal sulfate is employed in an amount of 5 percent to 100 percent by weight of the copper present in the ore. The copper chloride is employed in an amount of 5 percent to 40 percent of the weight of the copper in the ore, while the carbon is added in an amount sufficient to reduce the oxides in the ore. The resulting mixture is pelletized and heated to a temperature of 600°C to 750°C under a substantially inert or non-oxidizing atmosphere. The carbon acts to reduce the oxides in the ore concentrate and the impurities are entrapped within the chloride and sulfate salts. On cooling, a mixture of coarse copper particles, copper chloride and sulfate crystals are formed and the copper particles are then separated from the crystals. The copper chloride and sulfate are recycled as neither compound undergoes a chemical change in the process.

8 Claims, No Drawings

METHOD OF REFINING SUBSTANTIALLY SULPHUR-FREE COPPER ORE CONCENTRATES

BACKGROUND OF THE INVENTION

Certain copper ores contain copper oxides as well as various impurities such as iron oxides, silica, calcium and magnesium carbonates, and other gangue minerals. These ores are beneficiated by a number of methods to produce a product known as an oxide ore concentrate. Concentrates that are normally suitable for further refining are those produced by precipitation of copper from solution onto scrap iron, known in the trade as "cement-copper" concentrates. Copper ore concentrate is also produced by the Segregation process and by ammoniacal leach-precipitation processes that produce a copper oxide product from oxidic ores. The metallic and oxidic copper ore concentrates, although not in themselves sulphur-bearing, are normally smelted with sulphur rich materials so that the smelted product is a copper-iron-sulfide. This deliberately introduced sulfur is later evolved as $SO_2$ when the copper-iron sulfide is converted to metallic copper and an iron-rich slag. Since the sulfur is not directly recycled in the refining process, the use of this refining method on oxide ore concentrates must be viewed as contributing to atmospheric pollution.

SUMMARY OF THE INVENTION

The invention is directed to a method of refining copper ore concentrates that does not utilize sulphur-bearing materials, other than as a completely recycled processing reagent, and thereby eliminates any possibility of atmospheric pollution resulting from the generation of sulphur dioxide. According to the process of the invention, the ore concentrate is initially cleaned and dried under non-oxidizing conditions and then mixed with an alkali metal sulphate, copper chloride, preferably cuprous chloride, and carbon. The alkali metal sulphate is utilized in an amount of 5 percent to 100 percent by weight of the amount of copper present in the concentrate, the copper chloride is utilized in an amount of 5 percent to 40 percent by weight of the amount of copper present in the concentrate, and the carbon is employed in an amount sufficient to completely reduce the oxides in the concentrate.

The alkali metal sulphate, if recycled from previous runs, may also contain alkali metal chlorides and copper chlorides. These residual chlorides will be beneficial to the process, as long as the amount of the chlorides does not exceed about 40 percent of the amount of the alkali metal sulphates.

The mixture is then pelletized and heated to a temperature in the range of 600°C to 750°C, under a substantially inert or non-oxidizing atmosphere. At this temperature the carbon acts to reduce the copper oxides in the ore concentrate and the impurities are entrapped within the chloride and sulphate salts. On cooling, very coarse particles of copper are formed, dispersed among coarse crystals of the alkali metal sulphate. The major portion of the chloride and sulphate salts or crystals are separated from the copper particles by grinding and separation processes, and salts remaining with the copper can be removed by a water rinse which dissolves the salts. The resulting copper produced by the process of the invention is a coarse, granular, high purity powder.

As the copper is refined from the ore concentrate without the use of sulphur-bearing materials, other than as a completely recycled processing reagent, sulphur dioxide atmospheric pollution is eliminated.

DESCRIPTION OF THE PREFERRED EMBODIMENT

The process of the invention can be utilized to recover purified copper from copper ore concentrates produced by various methods. The ore concentrates that are most suitable for the process of the invention are those produced by precipitation of copper from solutions onto scrap iron, known in the trade as "cement-copper" concentrates, copper ore concentrates produced by the Segregation process, and ore concentrates produced by an ammoniacal leach preciptitation process, that produces a copper oxide from oxidic ores. In addition, scrap copper can be treated successfully by the process of the invention if it is first purified by an ammoniacal leach-precipitation process.

In general, the copper ore concentrates may contain a substantial proportion of copper oxide, including cuprous oxide and/or cupric oxide, along with various impurities such as iron and iron oxides, and other tramp metal from the cementation process, silica, and other gangue minerals.

The copper ore concentrate is initially cleaned by a series of preliminary cleaning steps which in themselves are not novel. The ore concentrate is initially crushed to break up the larger lumps and then screened, as for example by using a 10 mesh screen, to remove the coarse tramp matter. Following the screening, the ore concentrate is passed through magnetic separators to remove ferromagnetic impurities and then subjected to a conventional flotation process to recover the copper values while rejecting silica and other foreign matter. A chemical washing step can also be employed by using an acidified copper bearing solution that is described by R. D. Groves, J. K. Winter and S. J. Hussey in *Refining of Cement-Copper by Non-Smelting Techniques, U.S. Bureau* of Mines, paper presented at the AIME meeting February, 1970. Any one or more of the above preparatory cleaning steps can be included in the process depending on the nature of the ore concentrate being utilized.

Following the preliminary processing, the cleaned ore concentrate is dried under a non-oxidizing or reducing atmosphere, such as carbon monoxide, carbon dioxide, methane, nitrogen, or the like, and then mixed with a dry, finely pulverized, alkali metal sulphate, copper chloride, and carbon. Sodium or potassium are preferred as the alkali metals as they are readily available, but other alkali metals, such as lithium, rubidium, and cesium can also be utilized. In general, the alkali metal sulphate, should be employed in an amount of 5 percent to 100 percent by weight of the amount of copper present in the concentrate, and under most conditions a 30 percent weight addition of the alkali metal sulfate is preferred. The copper chloride should be employed in an amount of 5 percent to 40 percent by weight of the amount of copper present in the concentrate. A 20 percent to 30 percent weight addition of copper chloride is preferred. The copper chloride can take the form of either cuprous or cupric chloride. If cupric chloride is used, it will react with the copper metal or cuprous oxide in the system to form cuprous chloride on initial heating of the mixture.

Alkali metal sulfates and copper chloride recycled from previous runs can be utilized. If the alkali metal sulphate is recycled from previous runs, it may contain alkali metal chlorides, or copper chlorides, originating from residues remaining after acid treatment of the ore concentrate as well as from the copper chloride originally introduced. The chlorides in the recycled sulfate will be beneficial to the process, but should be utilized in an amount less than 40 percent by weight of the alkali metal sulphate. If recycled sulfates are employed that contain a substantial proportion of copper chloride, an equivalent amount of copper chloride can be deducted from the amount of copper chloride to be added to the ore concentrate.

The carbon is employed to reduce the copper oxides in the ore concentrate when the charge is heated to the processing temperature and will react with both cuprous oxide and cupric oxide to form copper and carbon dioxide. The amount of the oxides present in the ore concentrate is determined analytically and the carbon is added in an amount sufficient to provide complete reduction of the oxides.

The carbon to be employed may be any type of finely divided carbon, such as powdered charcoal, lamp black, powdered petroleum coke, or the like. In situations where the ore concentrate has a low oxide content, so that the carbon requirements are low, acetylene gas may be utilized in place of the carbon addition. Acetylene gas can be mixed with the ore concentrate before the heat treatment, and the acetylene will react with copper compounds, such as copper oxide and copper chloride, to form copper acetylide which in turn will decompose during the heat treatment to form copper and carbon.

After the ingredients are intimately mixed by means of a suitable blender, the mixture is pelletized and then heated under a substantially inert atmosphere of steam, carbon dioxide, or incompletely combusted natural gas to a temperature in the range of 600°C to 750°C. The charge is held at this temperature for a period of about 30 to 60 minutes, resulting first in the reduction of copper oxides by the carbon present, and then recrystallization of both the freshly reduced copper and the sulfate salt. The copper chloride exists at temperatures in the form of a liquid film that coats the alkali metal sulfate and copper particles and fills the interstices between the particles. Recrystallization of the solid alkali metal sulfate and copper particles occurs because both are very slightly soluble in copper chloride. The copper chloride serves as the medium through which the fine particles of copper and alkali sulfate can dissolve and reprecipitate. The impurites contained, and entrapped between particles of copper are taken into the copper chloride, either in solution or suspended in the liquid. These impurites are not entrapped by the newly formed copper particles, but often they are found to be entrapped within the particles of alkali sulfate.

After the heat treatment, the charge is cooled to room temperature and after cooling, the resulting structure consists of very coarse particles of copper dispersed among coarser crystals of metals salts. The mass is then pulverized by conventional dry milling equipment and the major portion of the salts are separated and collected for recycling after additional grinding. The minor proportion of the salts retained with the copper is separated from the copper by means of a water rinse which acts to dissolve the sulfate salts, while the remaining insoluble cuprous chloride comes off as a finely divided precipitate. The resulting soluttion can then be evaporated to recover the salts for recycling.

Following the water rinse, the copper particles are washed with an acid, such as hydrochloric acid, sulphuric acid, acetic acid, citric acid, or the like, again rinsed with water and dried under a non-oxidizing or reducing atmosphere. The acidic rinse removes any remaining salts or other impurities from the copper, and the acidic solution and rinse water can be employed for pretreating succeeding batches of incoming ore concentrate.

The impurities in the ore concentrate are removed primarily by entrapment in the salt and by the pre and post heat treatment acid washes. The impurities which are entrapped within the salt can be removed, if necessary, by dissolving the salt in water, filtering and recrystalizing the salt.

The resulting copper powder produced by the process is a coarse, granular and high purity product which is suitable for powder metallurgical application or for briquetting to form melting stock.

The process of the invention permits high purity copper to be removed from ore concentrates or copper bearing scrap without the use of sulphur-bearing materials, other than as a completely recycled processing reagent, and thus substantially reduces atmospheric pollution over processes utilizing sulphur-bearing materials.

The process also enables the alkali metal sulphates and copper chlorides to be recycled from batch to batch, thereby substantially reducing the cost of the processing reagents and minimizing disposal problems.

Various modes of carrying out the invention are contemplated as being within the scope of the following claims particularly pointing out and distinctly claiming the subject matter which is regarded as the invention.

I claim:

1. A method of recovering copper from copper-bearing substances, comprising the steps of mixing substantially non-sulfur-bearing copper ore concentrates containing a substantial proportion of copper oxides with an alkali metal sulphate, copper chloride, and a reducing material capable of reducing the copper oxides during subsequent heat treatment, said alkali metal sulfate being present in the mixture in an amount of 5 percent to 100 percent by weight of the copper present in the copper bearing substance, said copper chloride being present in an amount of 5 percent to 40 percent by weight of the copper present in the copper bearing substance and said reducing material being present in an amount sufficient to completely reduce the copper oxides in said substance, heating the mixture to a temperature in the range of 600°C to 750°C in a substantially non-oxidizing atmosphere to effect a reduction of the copper oxides and melt said copper chloride and cause both the copper particles and alkali metal sulfate to recrystallize in the melted copper chloride, cooling the mixture to provide a blend of particles of copper and crystals of the alkali metal sulphate and copper chloride, comminuting and separating the copper particles from said crystals.

2. The method of claim 1, wherein the reducing material is carbon.

3. The method of claim 1, wherein the step of separating is followed by the steps of rinsing the separated copper particles with water to dissolve any remaining sulphate crystals contained thereon, rinsing the copper particles with an acid to dissolve any remaining copper chloride and impurities, and thereafter rinsing the copper particles with water.

4. The method of claim 1, wherein the separated alkali sulfate and copper chloride are recycled and mixed with a subsequent batch of copper ore concentrate.

5. The method of claim 3, wherein the first mentioned rinse water is evaporated to recover the alkali metal sulphate and the acid rinse is used to pre-treat a succeeding batch of ore concentrate.

6. The method of claim 5, wherein the recovered alkali metal sulphate is recycled and mixed with a second batch of copper ore concentrate.

7. The method of claim 2, in which the ore concentrate is subjected to a preliminary cleaning operation prior to being mixed with the sulphate, copper chloride, and the carbon, said preliminary cleaning operation including the steps of contacting the ore concentrate with an acidic solution, water rinsing the ore concentrate and drying the ore concentrate under non-oxidizing conditions.

8. The method of claim 1, wherein an alkali metal chloride selected from the group consisting of lithium, sodium, potassium, rubidium and cesium chloride, and mixtures thereof is incorporated with the sulfate, said alkali metal chloride being present in an amount less than 40 percent by weight of the sulfate.

* * * * *